(12) United States Patent
Lichtenberg et al.

(10) Patent No.: US 11,252,374 B1
(45) Date of Patent: *Feb. 15, 2022

(54) ALTERING UNDESIRABLE COMMUNICATION DATA FOR COMMUNICATION SESSIONS

(71) Applicant: Amazon Technologies, Inc., Seattle, WA (US)

(72) Inventors: Kyle Adam Lichtenberg, Issaquah, WA (US); Terrence Wise, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,347

(22) Filed: Oct. 26, 2020

Related U.S. Application Data

(63) Continuation of application No. 16/595,179, filed on Oct. 7, 2019, now Pat. No. 10,819,950, which is a (Continued)

(51) Int. Cl.
*H04N 7/14* (2006.01)
*H04L 29/08* (2006.01)
(Continued)

(52) U.S. Cl.
CPC ............ *H04N 7/147* (2013.01); *G06N 3/08* (2013.01); *G10L 19/018* (2013.01); *G10L 25/84* (2013.01); *H04L 67/141* (2013.01)

(58) Field of Classification Search
CPC ...................................................... H04N 7/14
See application file for complete search history.

(56) References Cited

U.S. PATENT DOCUMENTS 7,564,476 B1 7/2009 Coughlan et al.
8,044,989 B2 10/2011 Mareachen
(Continued)

OTHER PUBLICATIONS

Non Final Office Action dated Jan. 22, 2019 for U.S. Appl. No. 16/123,653 "Altering Undesirable Communication Data for Communication Sessions" Lichtenberg, 8 pages.
(Continued)

*Primary Examiner* — Olisa Anwah
(74) *Attorney, Agent, or Firm* — Lee & Hayes, P.C.

(57) ABSTRACT

This disclosure describes techniques implemented partly by a communications service for identifying and altering undesirable portions of communication data, such as audio data and video data, from a communication session between computing devices. For example, the communications service may monitor the communications session to alter or remove undesirable audio data, such as a dog barking, a doorbell ringing, etc., and/or video data, such as rude gestures, inappropriate facial expressions, etc. The communications service may stream the communication data for the communication session partly through managed servers and analyze the communication data to detect undesirable portions. The communications service may alter or remove the portions of communication data received from a first user device, such as by filtering, refraining from transmitting, or modifying the undesirable portions. The communications service may send the modified communication data to a second user device engaged in the communication session after removing the undesirable portions.

17 Claims, 11 Drawing Sheets

Related U.S. Application Data continuation of application No. 16/123,653, filed on Sep. 6, 2018, now Pat. No. 10,440,324.

(51) Int. Cl.
  *G10L 19/018* (2013.01)
  *G10L 25/84* (2013.01)
  *G06N 3/08* (2006.01)

(56) References Cited

U.S. PATENT DOCUMENTS

| | | | |
|---|---|---|---|
| 8,994,781 B2 | 3/2015 | Anderson et al. | |
| 9,293,148 B2* | 3/2016 | Herger | H04M 9/08 |
| 9,313,454 B2 | 4/2016 | Lalonde et al. | |
| 9,531,998 B1 | 12/2016 | Farrell et al. | |
| 10,084,988 B2 | 9/2018 | Farrell et al. | |
| 10,446,170 B1* | 10/2019 | Chen | G10L 21/0208 |
| 2009/0041311 A1 | 2/2009 | Hundley | |
| 2013/0231930 A1 | 9/2013 | Sanso | |
| 2015/0279386 A1 | 10/2015 | Skoglund et al. | |
| 2016/0023116 A1 | 1/2016 | Wire et al. | |
| 2017/0289623 A1 | 10/2017 | Bailey et al. | |
| 2018/0053043 A1 | 2/2018 | Lawrence | |
| 2018/0091856 A1 | 3/2018 | Ayers et al. | |

OTHER PUBLICATIONS

Final Office Action dated Mar. 8, 2019 for U.S. Appl. No. 16/123,653 "Altering Undesirable Communication Data for Communication Sessions" Lichtenberg, 7 pages.

Office Action for U.S. Appl. No. 16/595,179, dated Mar. 18, 2020, Lichtenberg, "Altering Undesirable Communication Data for Communication Sessions", 5 Pages.

* cited by examiner

500

502 — ESTABLISH, AT LEAST PARTLY BY A COMMUNICATION SERVICE ASSOCIATED WITH A CLOUD-BASED SERVICE PROVIDER, A NETWORK-BASED COMMUNICATION SESSION BETWEEN A FIRST COMPUTING DEVICE AND A SECOND COMPUTING DEVICE

504 — RECEIVE, FROM THE FIRST COMPUTING DEVICE AND VIA THE NETWORK-BASED COMMUNICATION SESSION, FIRST COMMUNICATION DATA COMPRISING AT LEAST ONE OF FIRST AUDIO DATA REPRESENTING SOUND FROM AN ENVIRONMENT OF THE FIRST COMPUTING DEVICE OR FIRST VIDEO DATA REPRESENTING THE ENVIRONMENT

506 — IDENTIFY A PORTION OF THE FIRST COMMUNICATION DATA THAT CORRESPONDS TO A FINGERPRINT ASSOCIATED WITH AT LEAST ONE OF AN UNDESIRABLE SOUND OR AN UNDESIRABLE IMAGE

508 — ALTER THE PORTION OF THE FIRST COMMUNICATION DATA TO GENERATE SECOND COMMUNICATION DATA

510 — SEND THE SECOND COMMUNICATION DATA TO THE SECOND COMPUTING DEVICE VIA THE NETWORK-BASED COMMUNICATION SESSION

FIG. 5

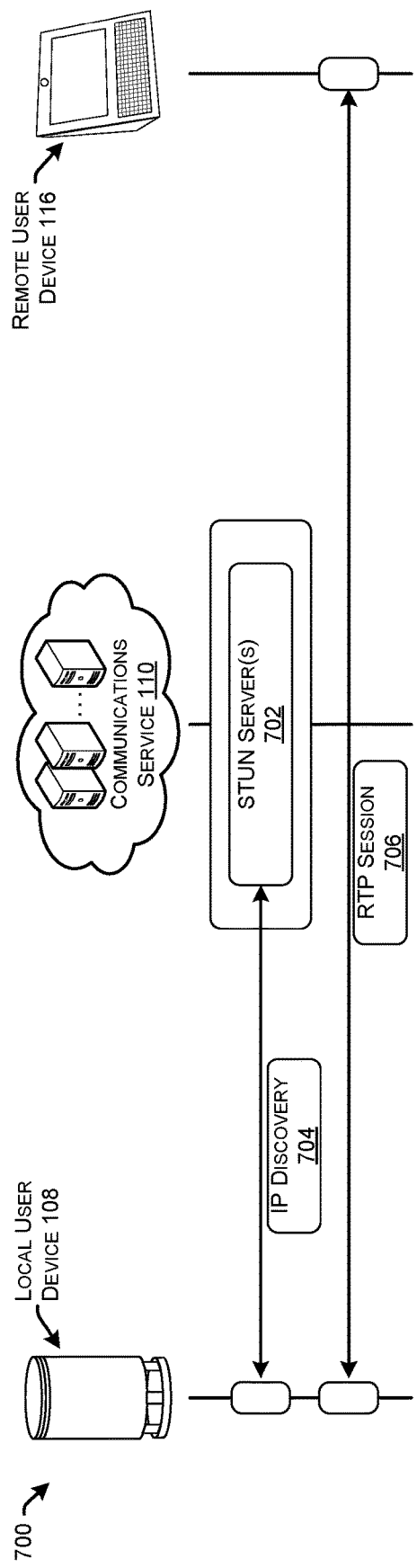
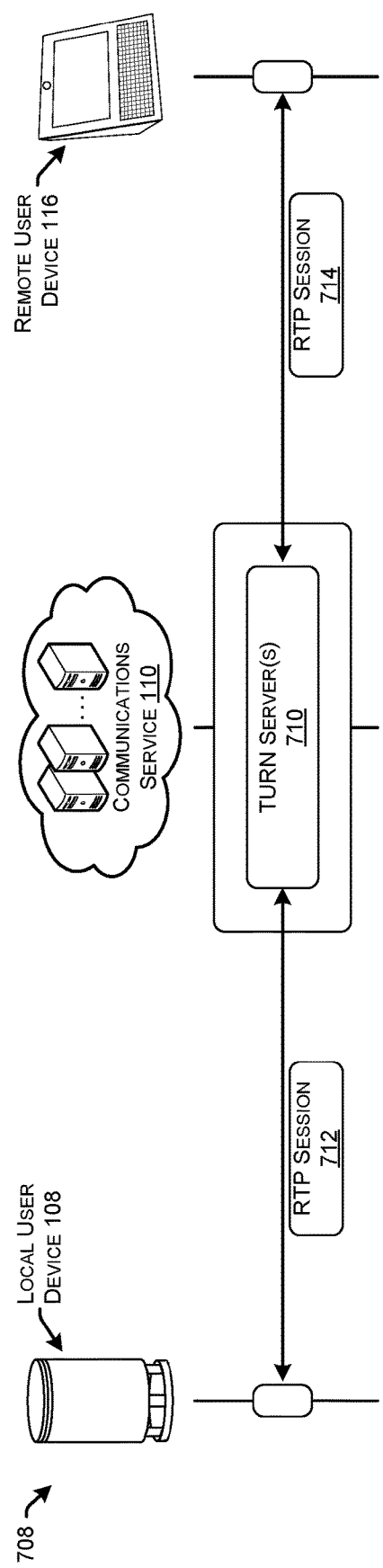

# US 11,252,374 B1

ALTERING UNDESIRABLE COMMUNICATION DATA FOR COMMUNICATION SESSIONS

RELATED APPLICATIONS

This application claims priority to and is a continuation of U.S. patent application Ser. No. 16/595,179, filed on Oct. 7, 2019, which is a continuation of U.S. patent application Ser. No. 16/123,653, filed on Sep. 6, 2018, the entire contents of which are incorporated herein by reference.

BACKGROUND

Performing online communications to connect users, such as teleconference calls, has become commonplace in today's society. Online communications help connect users who live and work in remote geographic locations. For example, many businesses utilize various Internet-based communication services that are easily accessible to employees in order to connect employees at different locations of the business, employees who work from home offices, etc. With such wide-spread access to the Internet, employees and other users are able to more efficiently and effectively communicate with each other using these Internet-based communication services. Additionally, Internet-based communication sessions enable large amounts of users to "call-in" to a communication session to listen in on a conversation and provide input.

While Internet-based communication sessions are useful for a variety of reasons, various issues often arise during these communication sessions. For example, a single user that has called-in to a conference call can disrupt the entire conference call with background noise if their microphone is not muted. Additionally, loud, annoying, or otherwise undesirable sounds can be heard on conference calls while users are talking, such as background noise. Further, unwanted images are often sent as part of a video call, such as improper gestures made by a user. Although it is possible to mute users or audiences, this often disrupts the flow of conversation as a muted user must become unmuted before providing input into the conversation. Accordingly, communication sessions often experience issues, such as unwanted background noise, that disrupt the natural flow of conversation.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method for identifying and altering undesirable sounds represented by audio data transmitted during communications sessions.

FIGS. 7A and 7B illustrate example components for a communications service to establish a flow of data between devices.

DETAILED DESCRIPTION

Figure 1:
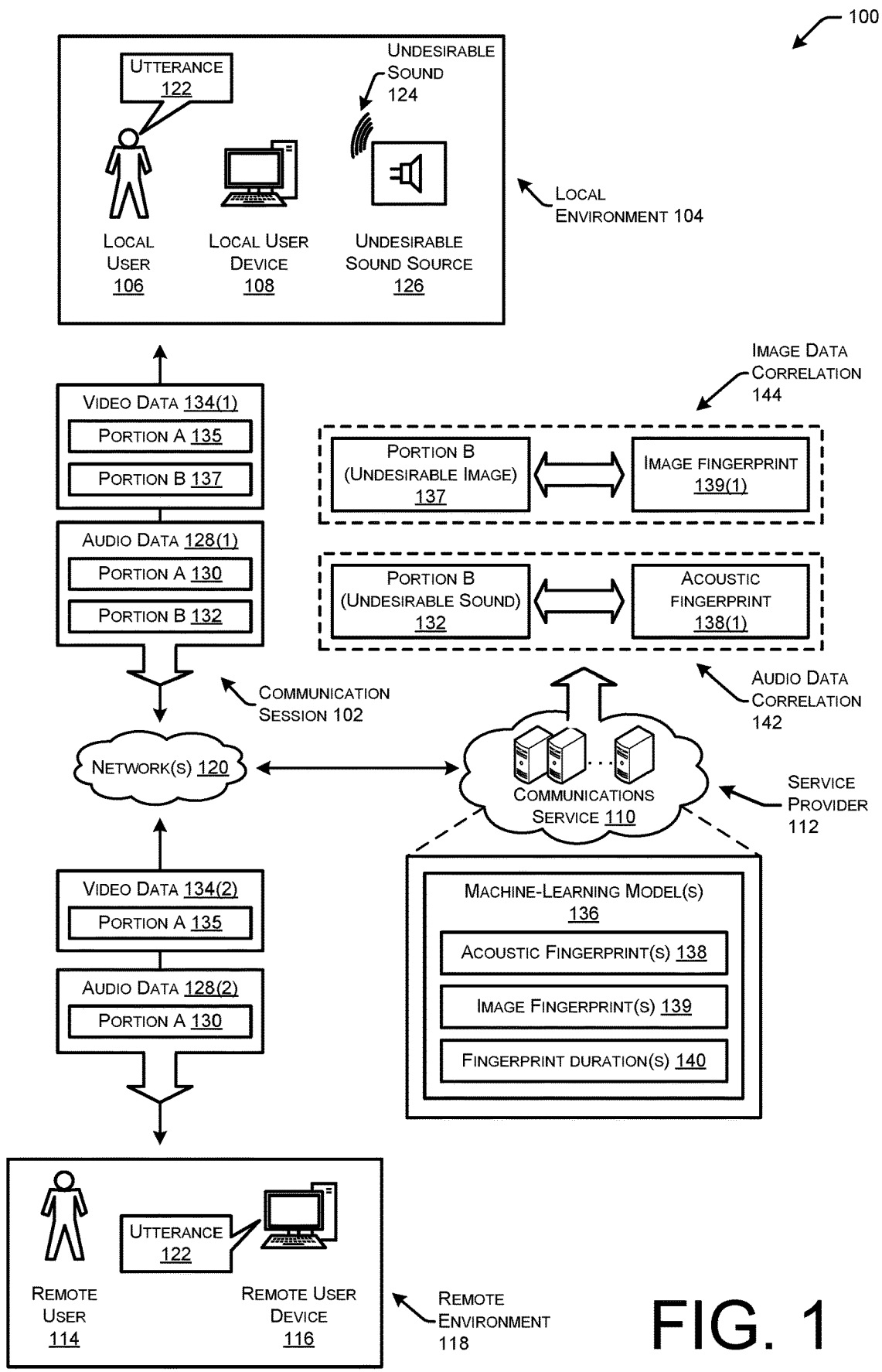
FIG. 1 illustrates a system-architecture diagram of an example environment in which a service provider provides a communications service which identifies and alters undesirable sounds and/or images represented by communication data sent during communications sessions.

This disclosure describes, at least in part, techniques for identifying and altering portions of communication data, such as audio data representing undesirable or unwanted sounds, or video data representing undesirable or unwanted images, from a communication session between computing devices, such as a dog barking, a user sneezing, a doorbell ringing, an improper hand gesture, etc. In some examples, a cloud-based service provider may provide a communication service that offers audio and/or video conferencing services to users. The users may enroll for use of the communication service to facilitate communication sessions with other users during which audio data and/or video data is streamed through one or more servers managed by the cloud-based service provider. According to the techniques described herein, the service provider may analyze the audio data to detect portions of audio data that represent undesirable sounds. Further, the service provider may analyze video data to detect portions of video data that represent undesirable images. The service provider may remove the undesirable portions of audio data and/or video data received from a sending user device, such as by filtering out the portions of audio/video data representing the unwanted sound/image, refraining from transmitting the portions of audio/video data representing the undesirable sound/image, etc., to generate modified audio/video data. The service provider may then send the modified audio/video data to a receiving user device engaged in the communication session. In this way, undesirable sounds/images that traditionally would be output by a receiving user device are removed, attenuated, or filtered out at intermediary server(s) of the communication service, which improves user satisfaction and reduces network bandwidth requirements for communication sessions.

As described herein, communication data may comprise only audio data, only video data, or a combination of audio data and video data. Accordingly, when describing techniques with reference to communication data, the techniques may be applicable to audio data, video data, or both audio data and video data. For example, removing a portion of communication data may comprise removing a portion of only audio data, removing a portion of only video data, or removing a portion of audio data and a portion of video data.

The techniques described herein may be performed at least partly using one or more machine-learning (ML) models. The service provider may train the ML model(s) to detect acoustic fingerprints and/or image fingerprints that represent unwanted or undesirable sounds and/or images. Generally, an acoustic fingerprint is a digital summary or representation of an audio signal (e.g., audio data) that can be used to identify similar audio signal samples. Similarly, an image fingerprint is a digital summary or representation of image data and/or video data that can be used to identify similar image or video samples. The service provider may obtain, with permission of users, logs of audio and/or video calls from previous communication sessions facilitated by the communication service as training data. For example, the service provider may identify previous communication sessions in which users had muted the audio data, turned off the video stream, had indicated as having poor quality, or otherwise indicate the inclusion of an undesirable sound and/or image. The service provider may then identify portions of the audio data and/or video data from the call logs that include or represent undesirable sounds and/or images and label or otherwise tag those portions of audio data and/or video data as representing undesirable sounds/images. Similarly, the service provider may label or otherwise tag portions of communication data as representing normal, or desirable, sounds/images/video. The service provider may then input the labeled or tagged communication data into an ML model (e.g., neural networks) to train the ML model to subsequently identify undesirable sounds/images from communication data.

As users engage in communication session using the communication service, communication data that passes through servers of the communication service may be evaluated against, or analyzed using, the ML model to detect portions of communication data that represent the undesirable sounds/images. For instance, the communication service may analyze the audio data streams in real-time, or near-real-time, using the ML model(s) to detect portions of audio data representing undesirable sounds. Additionally, or alternatively, the communication service may analyze video data streams in real-time, or near-real-time, using the ML model(s) to detect portions of video data representing undesirable images. The ML model(s) may be utilized to determine that a portion of the communication data corresponds to, is similar to, or is otherwise correlated to an acoustic fingerprint of an undesirable sound, or an image fingerprint of an undesirable image. In examples where the communication service performs removal of portions of communication data representing an undesirable sound/image in real-time, the ML model may be utilized to detect an initiation or beginning of the undesirable sound/image, such as a quick intake of air before a sneeze, an initial tone of a doorbell, a user moving their head back as they are about to sneeze, etc.

In some examples, the ML model(s) may not only be trained to identify portions of communication data that correspond to fingerprints of undesirable sounds/images, but the ML model(s) may further indicate durations of time for the fingerprints of the undesirable sounds/images. For example, the ML model(s) may determine that a portion of audio data is similar to an acoustic fingerprint for a doorbell chime, and further be trained to determine an amount of time that the doorbell chime sounds based on training data used to model the acoustic fingerprint of the doorbell chime. In this way, the communication service may also determine, using the ML model(s), an amount of time that the undesirable sound is likely to be represented by the audio data in the communication session.

Upon detecting a portion of communication data that represents the initiation of an undesirable sound/image, the communication service may perform various operations for removing, or otherwise preventing, the portion of communication data representing the undesirable sound from being sent from the server(s) to a receiving user device. For instance, the communication service may, in real-time or near-real-time, remove the immediately subsequent or adjacent portion of the communication data after detecting the initiation of the undesirable sound/image. The portion of the communication data may be removed in various ways, such as by simply removing all of the communication data in the communication data stream for the duration of time associated with the fingerprint, refraining from sending the portion of the communication data in the communication stream for the duration of time, attenuating a signal representing undesirable sound in the audio data stream, etc. In some examples, the communication service may perform more complex processing to remove the portion of communication data representing the undesirable sound/image. For instance, the communication service may identify a frequency band of the audio data in which the undesirable sound is located, and filter out data in that particular frequency band using digital filtering techniques. As another example, the communication service may identify locations in one or more frames of video data at which undesirable images are represented, and remove or at least partially occlude (e.g., blur) at least the undesirable images, or potentially the entire video data stream. In this way, only the communication data representing the undesirable sound/image may be removed, but other communication data during the same time period may be sent to the receiving computing device, such as audio data representing the user speaking. In this way, the communication service may train and utilize ML model(s) to detect and remove portions of communication data in a communication data stream that correspond to, or are similar to, fingerprints of undesirable sounds and/or images.

In some examples, the communication service may utilize generalized ML model(s) for all users that are trained using all different varieties of undesirable sounds, such as audio data representing different dogs barking or different doorbells, and undesirable images, such as video data representing images of different users sneezing or giving inappropriate gestures. However, the communication service may also further train the ML model(s) to create user-specific ML models. For example, the generalized ML model(s) may initially be used for all recently enrolled users, but the communication service may begin to train the generalized ML model using communication logs including communication data for specific user communication sessions to create user-specific ML models that are associated with user accounts. In this way, the ML models may be trained to more accurately identify undesirable sounds and/or images for specific users, such as barking from a dog of the specific users, unique sneezes for the specific users, etc.

Additionally, while the techniques described thus far have been with respect to real-time or near-real-time communications, in some examples the communication service may temporarily store the communication data in a data buffer to analyze the communication data to detect portions that represent undesirable sounds and/or images. In this way, the entire portion of communication data representing the undesirable sound and/or image may be identified and altered while stored in the data buffer, rather than potentially allowing an initial portion of the communication data representing the undesirable sound and/or image from being sent to a receiving device.

In examples where video-conferencing communication sessions are performed, video data may be analyzed to further aid in detecting portions of audio data that represent undesirable sounds. For example, the communication service may perform object recognition to detect a dog in an environment, and begin sampling the audio data at a higher rate in order to detect barking. As another example, the communication service may identify a user put their hand to their face and/or lean their head back in anticipation of a sneeze, which may increase the confidence that an undesirable sound of a sneeze will be represented in subsequent audio data.

In some examples, the techniques may be at least partly performed at the user's computing devices themselves prior to sending the audio data to the servers of the communication service. For example, the user computing devices may store the ML models locally to detect portions of communication data representing undesirable sounds/images generated by microphones/cameras of the user computing devices. Upon detecting the portion of the communication data representing the undesirable sound/image, the user computing devices may remove or otherwise prevent the portion of communication data from being sent to the servers. For example, the user computing devices may turn off the microphones/cameras, filter out or remove the portions of the communication data, refrain from sending the portion of the communication data, etc.

The techniques described herein target techniques rooted in computer-technology to solve problems rooted in computer technology, reduce bandwidth requirements for network-based communication sessions, and/or improve user experience during communication sessions. For example, microphones and cameras simply generate data representing sound and images for an environment, regardless of the sound/images and whether they are wanted or desirable. The techniques described herein contemplate utilizing computer-based filtering and/or other data processing techniques to remove unwanted or undesirable sounds/images. Additionally, by removing portions of communication data from a communication data stream, the techniques described herein reduce the amount of data being communicated over networks, which reduces bandwidth requirements.

FIG. 1 illustrates a system-architecture diagram of an example environment 100 in which a service provider provides a communications service which identifies and alters undesirable sounds represented by communication data transmitted during communications sessions 102.

As illustrated, a local environment 104 may include a local user 106 that is interacting with a local user device 108. In some examples, the local user 106 may have registered for use of a communications service 110 (e.g., Amazon Chime) that is provided, managed, or otherwise operated by a cloud-based service provider 112. In some examples, the communications service 110 may comprise a secure, real-time, unified communications service 110 that may be implemented as separate groupings of one or more computing devices including one or more servers, desktop computers, laptop computers, or the like. In one example, the communications service 110 is configured in a server cluster, server farm, data center, mainframe, cloud computing environment, or a combination thereof. To illustrate, the communications system 122 may include any number of devices that operate as a distributed computing resource (e.g., cloud computing, hosted computing, etc.) that provides conferencing services, such delivering audio and/or video communication services between devices of users.

In some examples, the local user 106 may utilize their local user device 108 to call a remote user 114 on a remote user device 116 in a remote environment 118, which may each comprise any type of device such as handheld devices or other mobile devices, such as smartphones, tablet computers, media players, personal computers, wearable devices, various types of accessories, or any other type of computing device. The communications service 110 may facilitate the flow of data between the local user device 108 and the remote user device 116 and over one or more networks 120. For example, the communications service 110 may establish and manage communication sessions 102 using any type of communication protocol, such as Voice over Internet Protocol (VoIP), Real-time Transport Protocol (RTP), Internet Protocol (IP), and/or any other type of network-based communication protocol.

As illustrated, the communications service 110 may have established, and maintained, a communication session 102 between the local user device 108 and the remote user device 116. In some examples, the local user device 108 may include a microphone to capture or generate audio data representing sound in the local environment 104, such as the local user 106 speaking an utterance 122. Generally, the local user 106 speaking the utterance 122 to the remote user 114 is a desired, or wanted, sound that is to be communicated over the communication session 102 to facilitate a conversation. However, the local user device 108 may also generate audio data representing unwanted or undesirable sounds, such as an undesirable sound 124 of an undesirable sound source 126.

Accordingly, the local user device 108 may generate audio data 128(1) to be sent or transmitted via the communication session 102 where the audio data 128(1) includes various portions, such as portion A 130 that represents the utterance 122 of the local user 106, and portion B 132 that represents the undesirable sound 124 of the undesirable sound source 126. Additionally, the audio data 128(1) may include other types of undesirable sounds, such as the local user 106 sneezing, the local user 106 saying inappropriate words, a doorbell chime ringing in the local environment 104, and so forth. Additionally, the local environment 104 and/or local user device 108 may include an imaging device configured to obtain video data 134 and/or video data depicting the local environment 104 of the local user 106. The local user device 108 may be associated with the imaging device, such as over a wireless communication network, and receive the video data 134 from the imaging device and transmit the video data 134 over the communication session 102. In some examples, the imaging device may be a camera included in the local user device 108 itself. In some examples, the video data 134 may be generated by a camera or other imaging device associated with the local user device 108. The video data 134 may also include various portions, such as portion A 135 that represents desirable images/video of the local environment 104, such as the face of the local user 106, and portion B 137 that represents an undesirable image/video, such as a portion of the video data 134 where the local user 106 sneezes, makes an inappropriate or crude gesture, etc.

The communications service 110 may facilitate, manage, or establish the communication session 102 such that the flow of audio data 128 and/or video data 134 passes over the network(s) 120, and also through one or more severs of the communications service 110. The communications service 110 may manage the flow of data, as described in more detail later in FIGS. 6, 7A, and 7B, by routing the data in the communication session 102 to the appropriate devices, such as remote user device 116.

According to the techniques described herein, the communications service 110 may receive the audio data 128 sent from devices, such as local user device 108, and identify and alter/remove unwanted or undesirable portions of the audio data 128 before re-sending or re-routing the audio data 128 to recipient devices, such as the remote user device 116. In some examples, the communications service 110 may include or store one or more machine-learning models 136 that are configured, or have been trained, to identify or otherwise detect one or more acoustic fingerprints 138 that represent different unwanted or undesirable sounds, such as the undesirable sound 124. Generally, an acoustic fingerprint 138 is a digital summary or representation of an audio signal (e.g., audio data) that can be used to identify similar audio signal samples. The ML model(s) 136 may not only be trained or configured to identify acoustic fingerprint(s) 138 corresponding to unwanted or undesirable sounds, but the ML model(s) 136 may further be trained to determine fingerprint duration(s) 140 for the acoustic fingerprint(s) 138. In this way, when the ML model(s) 136 identify a portion of the audio data 128(1) (e.g., portion B 132) that represents an undesirable sound (e.g., undesirable sound 124), the ML model(s) 136 may further determine a period of time, or fingerprint duration(s) 140, for the detected acoustic fingerprint(s) 138.

As illustrated in FIG. 1, the communications service 110 may analyze the audio data 128(1) using the ML model(s) 136 and identify an audio data correlation 142 between portion B 132 of the audio data 128(1) and an acoustic fingerprint 138(1) for an undesirable sound 124, such as a dog barking, a user sneezing, a doorbell, a background appliance running, etc. In this way, the communications service 110 utilizes the ML model(s) 136 to detect undesirable or unwanted sounds represented in audio data 128 in order to remove the unwanted portions.

Upon detecting or identifying the portion B 132 of the audio data 128(1) that is correlated to, or similar to, the acoustic fingerprint 138(1), the ML model(s) 136 may output or otherwise be utilized to identify an associated (e.g., mapped) fingerprint duration(s) 140. The fingerprint duration(s) 140 may indicate a period of time that the sound represented by the acoustic fingerprint 138(1), and thus the portion B 132 of the audio data 128(1), lasts. Stated otherwise, the fingerprint duration(s) 140 may indicate how long the undesired sound, or the undesirable sound 124 in this example, lasts based on training data used to train the ML model(s) 136. Using the fingerprint duration(s) 140, the communications service 110 may alter/remove the portion B 132 from the audio data 128(1) to generate modified audio data 128(2) that includes portion A 130 audio data 128(1) that represents wanted or desired sound, such as the utterance 122, but does not include portion B 132 that represents the undesirable sound 124.

For example, the communications service 110 may, upon detecting portion B 132 of the audio data 128(1) that represents the initiation of an undesirable sound (undesirable sound 124), the communication service 110 may perform various operations for altering, removing, or otherwise preventing, the portion B 132 of audio data 128(1) representing the undesirable sound 124 from being sent from the server(s) to a remote user device 116. For instance, the communication service 110 may, in real-time or near-real-time, alter or remove the immediately subsequent or adjacent portion B 132 of the audio data 128(1) after detecting the initiation of the undesirable sound. The portion B 132 of the audio data 128(1) may be removed in various ways, such as by simply removing all of the audio data in the audio data stream for the fingerprint duration 140 of time associated with the acoustic fingerprint 138(1), or refraining from sending the portion B 132 of the audio data 128(1) in the audio stream for the duration 140 of time. In some examples, the communication service 110 may perform more complex processing to remove the portion B 132 of the audio data 128(1) representing the undesirable sound. For instance, the communication service 110 may identify a frequency band of the portion B 132 of the audio data 128(1) in which the undesirable sound is located, and filter out data in that particular frequency band using digital filtering techniques. In this way, only the audio data 128 representing the undesirable sound may be removed, but other audio data 128 during the same time period may be sent to the remote user device 116, such as the portion A 130 of the audio data 128 representing the utterance 122 of the local user 106. In this way, the communication service 110 may utilize the ML model(s) 136 to detect and remove portions 132 of audio data 128 in an audio data stream that correspond to, or are similar to, acoustic fingerprints of undesirable sounds.

In examples, the communications service 110 may provide video-conferencing communication sessions 102 where the video data 134 may be analyzed to further aid in detecting the portion B 132 of audio data 128(1) that represent undesirable sound. For example, the communication service 110 may perform object recognition on the video data 134 to detect the undesirable sound source 126 in the local environment 104, and begin sampling the audio data 128 at a higher rate in order to detect and remove barking 124.

After removing the portion B 132 of the audio data 128, the communications service 110 may send the audio data 128(2) and the video data 134 to the remote user device 116. As illustrated, the remote user device 16 may output the speech utterance 122, but does not output the undesirable sound 124 as it was removed by the communications service 110.

In some examples, the communications service 110 may additionally, or alternatively, receive the video data 134 sent from devices, such as local user device 108, and identify and alter/remove unwanted or undesirable portions of the video data 134 before re-sending or re-routing the video data 134 to recipient devices, such as the remote user device 116. In some examples, the communications service 110 may utilize the ML model(s) 136 that may further be configured, or trained, to identify or otherwise detect one or more image fingerprints 139 that represent different unwanted or undesirable images (or video frames/portions) from the video data 134. Generally, an image fingerprint 138 is a digital summary or representation (e.g., vector) of an image, picture, video frame or any other type of image/video data that can be used to identify similar image samples. The ML model(s) 136 may not only be trained or configured to identify image fingerprint(s) 139 corresponding to unwanted or undesirable images, but the ML model(s) 136 may further be trained to determine fingerprint duration(s) 140 for the image fingerprint(s) 139. In this way, when the ML model(s) 136 identify a portion of the video data 134 (e.g., portion B 137) that represents an undesirable image, the ML model(s) 136 may further determine a period of time, or fingerprint duration(s) 140, for the detected image fingerprint(s) 139. In some examples, the image fingerprints 139 may comprise a single vector, multi-dimensional vectors, or a grouping of vectors, that correspond or represent image data or video data that represent or depict undesirable images/videos, such as crude hand gestures, inappropriate facial expressions, a user sneezing or coughing, a user picking their teeth or nose, etc.

As illustrated in FIG. 1, the communications service 110 may analyze the video data 134 using the ML model(s) 136 and identify an image data correlation 144 between portion B 137 of the video data 134 and an image fingerprint 139(1) for an undesirable image 137, such a user sneezing or making a crude gesture. In this way, the communications service 110 utilizes the ML model(s) 136 to detect undesirable or unwanted images/video represented in video data 134 in order to remove the unwanted portions. For instance, the ML model(s) 136 may receive one or more input vectors that represent the video data 134, and be trained to determine that the input vectors have more than a threshold amount of image data correlation 144 to image fingerprints 139.

Upon detecting or identifying the portion B 137 of the video data 134 that is correlated to, or similar to, the image fingerprint 139(1), the ML model(s) 136 may output or otherwise be utilized to identify an associated (e.g., mapped) fingerprint duration(s) 140. The fingerprint duration(s) 140 may indicate a period of time that the video data 134 represents the image fingerprint 139(1), and thus the portion B 137 of the video data 134, lasts. Stated otherwise, the fingerprint duration(s) 140 may indicate how long the undesired portion of the video, or image, lasts based on training data used to train the ML model(s) 136. Using the fingerprint duration(s) 140, the communications service 110 may alter/remove the portion B 137 from the video data 134 to generate modified video data 134(2) that includes portion A 135 of video data 134(1) that represents wanted or desired images/video, such as the face of the local user 106 for at least a period of time, but does not include portion B 137 that represents the undesirable image/video for a period of time.

For example, the communications service 110 may, upon detecting portion B 137 of the video data 134(1) that represents the initiation of an undesirable image/video, the communication service 110 may perform various operations for altering, removing, or otherwise preventing, the portion B 137 of video data 134(1) representing the undesirable image/video 124 from being sent from the server(s) to a remote user device 116. For instance, the communication service 110 may, in real-time or near-real-time, alter or remove the immediately subsequent or adjacent portion B 137 of the video data 134(1) after detecting the initiation of the undesirable image/video. In some examples, altering may include blurring, placing a box or other graphic on top of the undesirable image, or otherwise occluding the undesirable image/video from view. The portion B 137 of the video data 134(1) may also be removed in various ways, such as by simply removing all of the video data in the video data stream for the fingerprint duration 140 of time associated with the image fingerprint 139(1), or refraining from sending the portion B 137 of the video data 134(1) in the video stream for the duration 140 of time. In some examples, the communication service 110 may perform more complex processing to remove the portion B 137 of the video data 134(1) representing the undesirable image/video. For instance, the communication service 110 may identify a portion of the portion B 137 of the video data 134(1) in which the undesirable image/video is located, and filter out data in that particular portion of the image data while leaving other portions of the image data using digital filtering techniques. In this way, only the video data 134 representing the undesirable image/video may be removed, but other video data 134 during the same time period may be sent to the remote user device 116, such as the portion A 135 of the video data 134 representing the face of the local user 106. In this way, the communication service 110 may utilize the ML model(s) 136 to detect and remove portions 132 of video data 134 in a video data stream that correspond to, or are similar to, image fingerprints 139 of undesirable image/videos.

Figure 2:
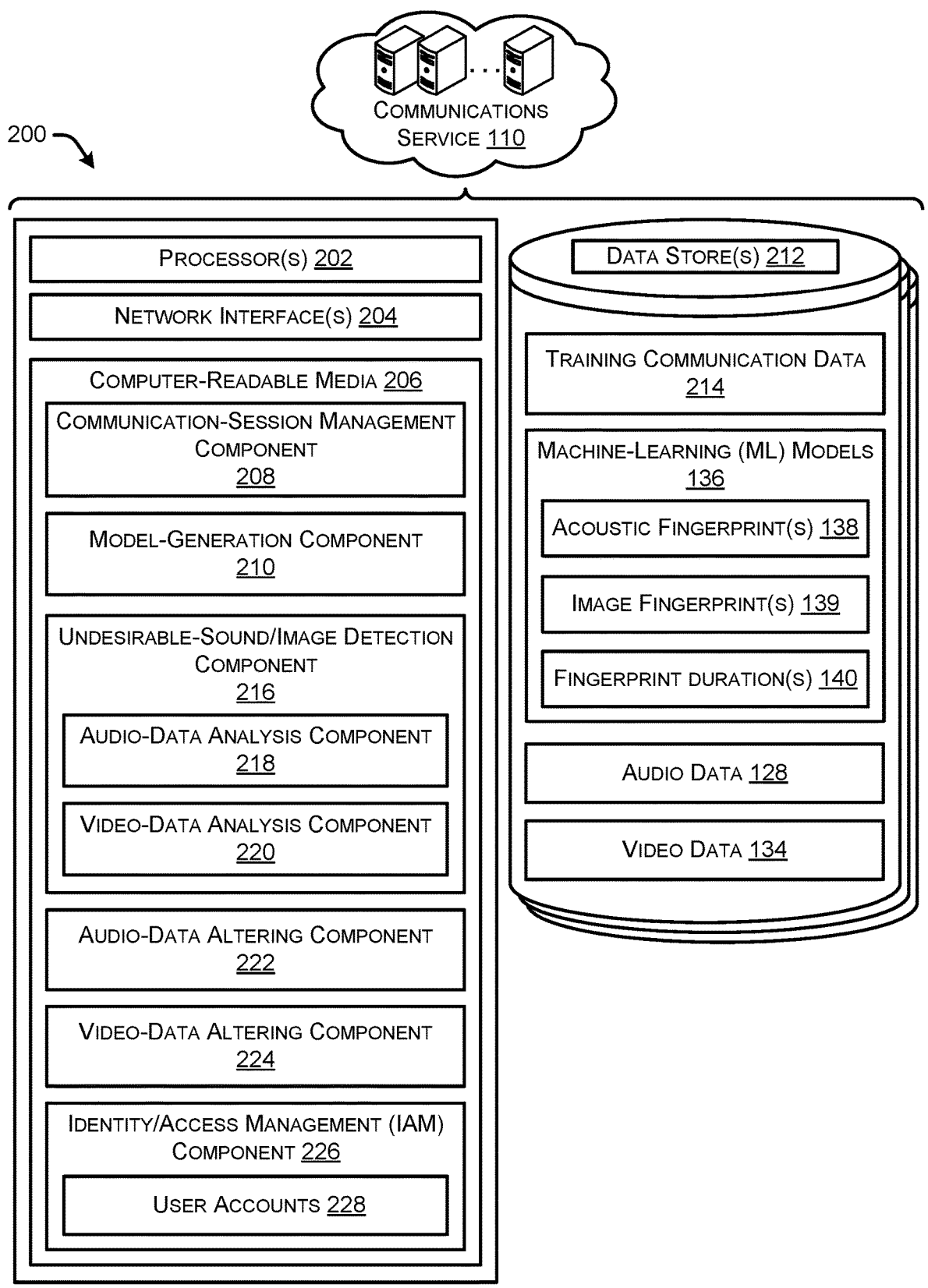
FIG. 2 illustrates a component diagram of an example communications service that includes components to provide an audio data filtering service to identifies and alters undesirable sounds and/or images represented by communication data sent during communications sessions.

FIG. 2 illustrates a component diagram of an example communications service 110 that includes components to provide an audio data filtering service to identify and remove undesirable sounds from audio data communicated during a communications session.

As illustrated, the communications service 110 may include one or more hardware processors 202 (processors) configured to execute one or more stored instructions. The processor(s) 202 may comprise one or more cores. Further, the communications service 110 may include one or more network interfaces 204 configured to provide communications between the communications service 110 and other devices, such as the user device(s) 108/116. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The communications service 110 may also include computer-readable media 206 that stores various executable components (e.g., software-based components, firmware-based components, etc.). In addition to various components discussed in FIG. 1, the computer-readable-media 206 may further store a communication-session management component 208, a model-generation component 210, an undesirable-sound/image detection component 216 (that includes an audio-data analysis component 218 and a video-data analysis component 220), an audio-data altering component 222, a video-data altering component 224, and an identity/access management (IAM) component 226 that is associated with various user accounts 228.

Generally, the communication-session management component 208 may be configured to at least partly orchestrate or establish the communication sessions 102. The communication-session management component 208 may perform some or all of the operations of FIGS. 6, 7A, and 7B for establishing and maintain the communication sessions 102. The communication-session management component 208 may orchestrate and/or establish communication sessions 102 over any type of network 120 utilizing any type of communication protocol known in the art.

The model-generation component 210 may be configured to perform operations to generate and/or train the ML model(s) 136. For instance, the model-generation component 210 may utilizing training communication data 214 to train the ML model(s) 136 to identify or detect audio data 128 that represents undesirable sounds, and also to identify or detect video data 143 (or image data) that represents undesirable images/video. Further description of the techniques performed by the model-generation component 210 may be found below with respect to FIG. 3.

The undesirable-sound/image detection component 216 may perform various techniques for detecting or identifying undesirable sounds/images represented in portions of audio data 128 and/or video data 134. For example, the audio-data analysis component 218 may utilize the ML model(s) 136 to determine correlations between audio data 128 and the acoustic fingerprints 138 of undesirable sounds that the ML models 136 are trained to identify. In some examples, the audio-data analysis component 218 may evaluate audio data 128 in real-time or near-real-time against the ML models 136 in order to determine a confidence value, or a value indicating a level or similarity, between the portions of the audio data 128 and acoustic fingerprints 138. If the audio-data analysis component 218 determines that the ML model 136 has indicated that a portion of the audio data 128 has a similarity value, or correlation value, that is greater than some threshold value, the audio-data analysis component 218 may determine that the portion of the audio data 128 corresponds to an acoustic fingerprint 138 of an undesirable sound.

Further, the audio-data analysis component 218 may receive an indication from the ML models 136 of a fingerprint duration 140 for a fingerprint 138 that audio data corresponds to or correlates to. In this way, the audio-data analysis component 218 may determine how much audio data 128 needs to be removed or filtered out from the stream of audio data 128.

In some examples, the audio-data analysis component 218 may include or involve the use of a Hidden Markov Model (HMM) recognizer that performs acoustic modeling of the audio data 128, and compares the HMM model of the audio data 128 to one or more reference HMM models (e.g., ML model(s) 136) that have been created by training for a specific trigger expression. In some examples, the ML model(s) 136 may include, or utilize the HMM model(s) which represent a word or noise as a series of states. Generally, a portion of audio data 128 is analyzed by comparing its HMM model to an HMM model of the trigger expression, yielding a feature score that represents the similarity of the audio data 128 to the trigger expression model (e.g., acoustic fingerprint(s) 138). In practice, an HMM recognizer may produce multiple feature scores, corresponding to different features of the HMM models. The ML model(s) 136 may also use a support vector machine (SVM) classifier that receives the one or more feature scores produced by the HMM recognizer. The SVM classifier produces a confidence score indicating the likelihood that audio data 128 contains the trigger expression (e.g., acoustic fingerprint(s) 138).

The video-data analysis component 220 may perform various image-processing techniques on the video data 134 during a video conference session 102 in order to at least help detect whether an undesirable sound is represented by the audio data 128. For example, the video-data analysis component 220 may perform object recognition to detect a dog in an environment, and begin sampling the audio data 128 at a higher rate in order to detect barking. As another example, the video-data analysis component 220 may identify a user put their hand to their face and/or lean their head back in anticipation of a sneeze, which may increase the confidence that an undesirable sound of a sneeze will be represented in subsequent audio data. In some examples, the video-data analysis component 220 may utilize these techniques in combination with the audio-data analysis component 218 to detect undesirable sounds represented by audio data 128. For instance, if the video-data analysis component 220 identifies a dog in the video data 128, the confidence value that the audio data 128 represents a dog barking as determine by the audio-data analysis component 218 may be increased. The different weighting of the confidence values may be performed in various ways in order to achieve more optimal results.

In some examples, the video-data analysis component 220 may further perform various image-processing techniques on the video data 134 during a video conference session 102 in order to identify and alter/remove undesirable portions of the video data 134 from the session 102. For example, the video-data analysis component 220 may perform various computer-vision techniques, such as Object Recognition (also called object classification) where one or several pre-specified or learned objects or object classes can be recognized, usually together with their 2D positions in the image or 3D poses in the video/image data. Additionally, the video-data analysis component 220 may perform identification techniques where an individual instance of an object is recognized, such as identification of a specific person's face or fingerprint, identification of handwritten digits, or identification of a specific vehicle. can be further analyzed by more computationally demanding techniques to produce a correct interpretation. Additionally, the video-data analysis component 220 may perform may perform Optical Character Recognition (OCR), or identifying characters in images of printed or handwritten text, usually with a view to encoding the text in a format more amenable to editing or indexing (e.g., ASCII). 2D Code Reading—Reading of 2D codes such as data matrix and QR codes. Additionally, the video-data analysis component 220 may perform Facial Recognition and/or Shape Recognition Technology (SRT) where the video-data analysis component 220 may perform differentiates human beings (e.g., head and shoulder patterns) from objects. The video-data analysis component 220 may perform feature extraction to extract image features from the video data 134 at various levels of complexity, such as lines, edges, and ridges; localized interest points such as corners, blobs, or points; more complex features may be related to texture, shape, or motion, etc. The video-data analysis component 220 may perform detection/segmentation where a decision may be made about which image points or regions of the image/video data 134 are relevant for further processing, such as segmentation of one or multiple image regions that contain a specific object of interest; segmentation of the image into nested scene architecture comprising foreground, object groups, single objects, or salient object parts (also referred to as spatial-taxon scene hierarchy).

The video-data analysis component 220 may input the feature data that represents all of the video data 134, or represents objects of interest in the video data 134, into the ML model(s) 136. The ML model(s) 136 may be configured to compare the feature data with image fingerprint(s) 139 to determine whether the video data 134 includes video/images that correspond to undesirable images/video represented by the image fingerprint(s) 139. For example, if the ML model(s) 136 determine that feature data representing the video data 134 matches to feature data for an image fingerprint 139 by more than a threshold amount, the ML model(s) 136 may output an indication of the image fingerprint 139 and also the associated fingerprint duration 140. In this way, the vide-data analysis component 220 may determine whether video data 134 represents an undesirable image/video using an ML model(s) 136.

The audio-data altering component 222 may perform various operations for altering, removing, and/or filtering out portions of the audio data 128 that represent undesirable sounds 126. For example, the audio-data altering component 222 may, in real-time or near-real-time, alter (e.g., digitally attenuate/sample audio data to lower an output volume) or remove the immediately subsequent or adjacent portion of the audio data 128 after detecting the initiation of the undesirable sound 126. The portion of the audio data 128 may be removed in various ways, such as by simply removing all of the audio data 128 in the communication session 102 for the fingerprint duration 140 of time associated with the acoustic fingerprint 138, or refraining from sending the portion of the audio data 128 in the audio stream of the communication session 102 for the fingerprint duration 140 of time. In some examples, the audio-data altering component 222 may perform more complex processing to remove the portion of audio data 128 representing the undesirable sound. For instance, the audio-data altering component 222 may identify a frequency band of the audio data 128 in which the undesirable sound is located, and filter out data in that particular frequency band using digital filtering techniques. In this way, only the audio data 128 representing the undesirable sound may be removed, but other audio data 128 during the same time period may be sent to the remote user device 116, such as audio data 128 representing the user speaking. As a specific example, the undesirable sound 124 may have occurred at an overlapping time with the utterance 122, but the audio-data altering component 222 may remove only the undesirable sound 124 such that the utterance 122 is still represented by the audio data 128(2) and output by the remote user device 116.

In some examples, rather than removing or filtering out representations of the undesirable sound 124, the audio-data altering component 222 may attenuate or otherwise modify the audio data 128. For instance, the audio-data altering component 222 may digitally attenuate, or sample, portions of the audio data 128 (e.g., portion B 132) that represent the undesirable sound 124 such that the undesirable sound 124 is output at a lower volume by the remote user device 116.

In some examples, the audio-data altering component 222 may also add in or mix audio clips/data into the portions of the audio data 128 from which the undesirable sound was removed. As an example, the audio-data altering component 222 may insert various audio clips in place of the undesirable sounds to be output by the remote user device 116. As an example, rather than outputting the undesirable sound 124, the audio data 128(2) may have an audio clip inserted in such that the remote user device 116 outputs a text-to-speech phrase saying that a dog is barking.

The video-data altering component 224 may perform various operations for altering, removing, and/or filtering out portions of the video data 134 that represent undesirable images or video. For example, the video-data altering component 224 may, in real-time or near-real-time, remove the immediately subsequent or adjacent portion of the video data 134 after detecting the initiation of the undesirable image/video. The portion of the video data 134 may be removed in various ways, such as by simply removing all of the video data 134 in the communication session 102 for the fingerprint duration 140 of time associated with the image fingerprint 139, or refraining from sending the portion of the video data 134 in the video stream of the communication session 102 for the fingerprint duration 140 of time. In some examples, the video-data altering component 224 may perform more complex processing to remove the portion of video data 134 representing the undesirable image/video. For instance, the video-data altering component 224 may identify locations in frames of the video data 134 at which the undesirable image(s) are placed and modify or alter those locations. For example, the video-data altering component 224 may blur out the locations of the undesirable image(s) in the frames, while leaving the other video data 134 un-blurred. Further, the video-data altering component 224 may place objects or graphics over the undesirable image data and/or video data for the fingerprint duration 140.

In some examples, the audio-data altering component 222 may also add in or mix video clips/data into the portions of the video data 134 from which the undesirable sound was removed. As an example, the video-data altering component 224 may insert various video clips or images in place of the undesirable images to be output by the remote user device 116. As an example, rather than outputting the undesirable image, the video data 134 may have a video clip inserted in such that the remote user device 116 outputs a happy face, or a picture of the local user 106.

The computer-readable media 206 may store an identity and access management (IAM) component 226. To utilize the services provided by the service provider 112, the user 106 and/or the remote user 114 may register for an account with the communications service 110. For instance, users 106/114 may utilize their devices 108/116 to interact with the IAM component 226 that allows the users 108/116 to create user accounts 228 with the communications service 110. Generally, the IAM component 226 may enable users 108/116 to manage access to their cloud-based services and computing resources securely. Using the IAM component 226, users 108/116 can provide input, such as requests for use of the communications service 110. Each user 108/116 that is permitted to interact with services associated with a particular account 228 may have a user identity/profile assigned to them. In this way, users 108/116 may log in with sign-in credentials to their account(s) 228, perform operations such as initiating and/or requesting a communications session 102.

In some examples, the undesirable-sound/image detection component 216 may detect undesirable sounds and/or images based on the user accounts 228 involved in a communication session 102. For example, if the user accounts 228 indicate that a boss is talking to an employee, the undesirable-sound/image detection component 216 may be more restrictive and remove bad words, bad statements about the company, images of the employee picking their teeth or another embarrassing act. Alternatively, if the user accounts 228 indicate that a son is talking to his mom, then sounds may not be filtered out, such as kids yelling in the background because the mom may wish to hear her son's kids.

In some examples, the undesirable-sound/image detection component 216 may detect only undesirable audio data, only undesirable video data, or at least partially overlapping portions of undesirable audio data and video data (e.g., a bad word along with a crude gesture). In some examples, the undesirable-sound/image detection component 216 may be configured to detect words for business purposes, such as by removing names of products that have not been disclosed to the public by a company to protect the public disclosure of that item. In some examples, if the undesirable-sound/image detection component 216 detects a user account 228 for which audio data 128 and/or video data 134 is altered or removed for more than a threshold amount, the undesirable-sound/image detection component 216 may perform various actions. For instance, the undesirable-sound/image detection component 216 may recommend to human resources that the user of the user account 228 receive additional behavior training.

In some examples, the undesirable-sound/image detection component 216 may interact with third-party, or other external sensors. For example, if the local user device 108 is associated with a door sensor that indicates a door is opening, the undesirable-sound/image detection component 216 may have a high amount of confidence that a dog will begin barking soon thereafter. In this way, the undesirable-sound/image detection component 216 may start sampling the audio data 128 more frequently to remove most, or all, of the sound of the dog barking.

In some examples, the undesirable-sound/image detection component 216 may implement a "child mode" where certain words or actions are always removed by the undesirable-sound/image detection component 216, such as crude language or jokes, or crude gestures. Additionally, the audio clips and/or video clips may be tailored to children when the audio clips/video clips are inserted in, such as children songs and/or images/clips that children would enjoy.

In some examples, the audio-data altering component 222 and/or the video data altering component 224 may alter the audio data 128 and/or video data 134 for the associated fingerprint duration 140, and in other examples, the audio-data altering component 222 and/or the video data altering component 224 may alter the audio data 128 and/or video data 134 until the undesirable sound/image is no longer included in the audio data 128 and/or video data 134. For instance, the audio-data altering component 222 may continue to alter or remove the undesired portion of the audio data 128 until the audio-data analysis component 218 indicates that the sound is no longer represented in the audio data 128. Similarly, the video-data altering component 224 may continue to alter or remove the undesired portion of the video data 134 until the video-data analysis component 220 indicates that the undesired image is no longer represented in the video data 134.

Figure 3:
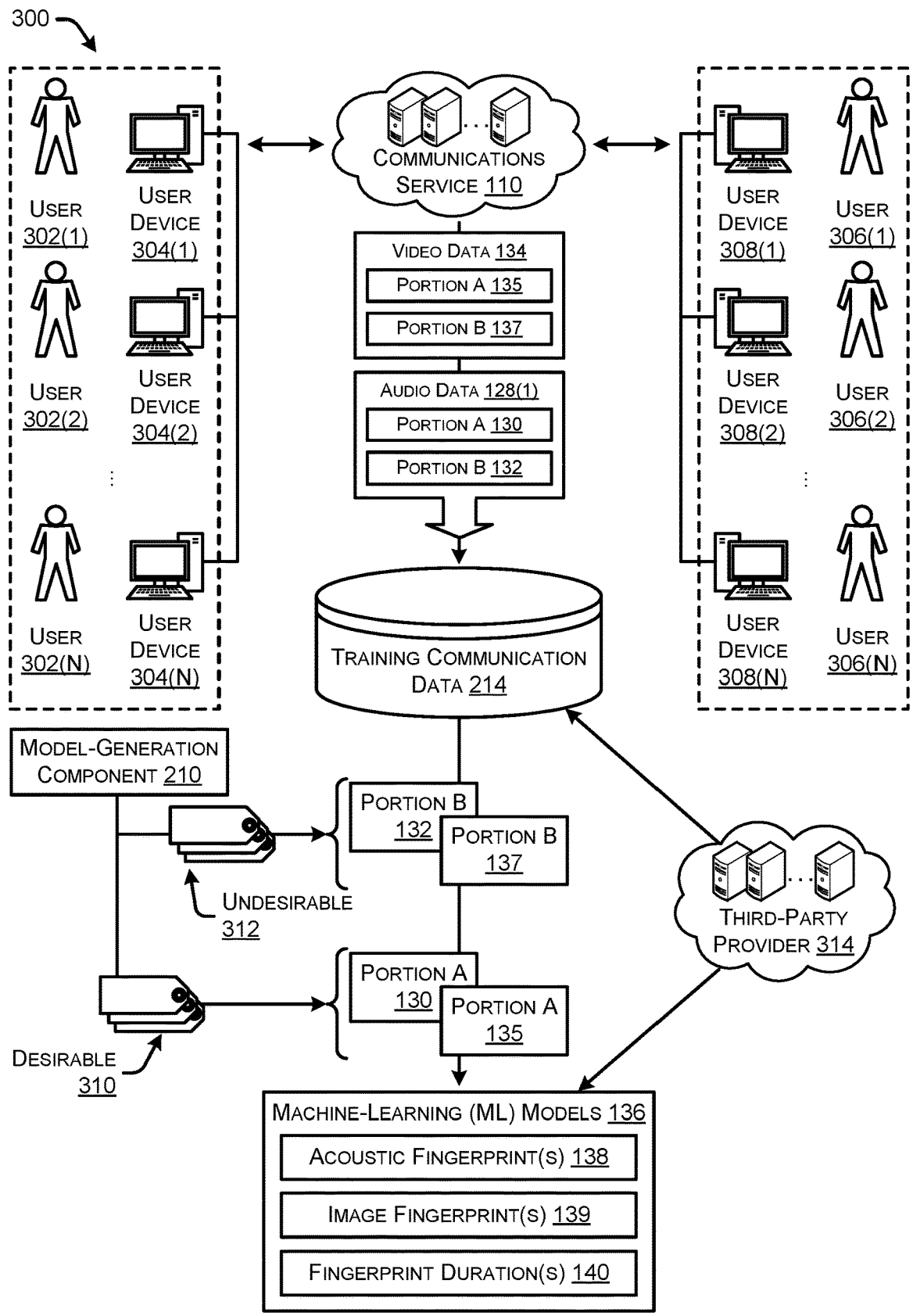
FIG. 3 illustrates a system-architecture diagram of an example environment in which a service provider trains one or more machine-learning models to identify undesirable sounds and/or images from communication data sent during communications sessions.

FIG. 3 illustrates a system-architecture diagram of an example environment 300 in which service provider 112 trains one or more machine-learning models 136 to identify undesirable sounds from audio data communicated during communications sessions 102.

As illustrated in FIG. 3, a plurality of users 302(1), 302(2), 302(N) may subscribe for use of the communications service 110 to establish and manage communication sessions 102 using their respective user devices 304(1), 304(2), 304(N) with a plurality of other users 306(1), 306(2), 306(N) via their associated user devices 308(1), 308(2), and 308(N).

The communications service 110 may utilize the audio data 128 communicated between the user devices 304 and 308 as training data 214. For instance, the users 302 and 306 may give permission for the communications service 110 to utilize logs of audio calls from previous communication sessions 102 facilitated by the communication service 110 as training communication data 214. The model-generation component 212 may label, tag, or otherwise indicate audio data calls and/or portions of audio data calls as representing desirable 310 or undesirable 312 sounds. For example, the model-generation component 212 may tag, label, or associate a desirable tag 310 with portions A 130 audio data 128 that represents normal, or desired audio data (e.g., all audio data but undesirable audio data), and may further tag, label, or associate an undesirable tag 312 with portions B 132 of audio data 128 to indicate they represent undesirable sounds (e.g., dog barking, sneezing, doorbell, loud noises, inappropriate language, etc.). The model-generation component 210 may then input the tagged audio data 128 into the machine-learning model(s) 136 to train the ML model(s) 136 to detect acoustic fingerprints 138 that represent different unwanted or undesirable sounds. The ML model(s) 136 may comprise any type of machine-learning model, such as neural networks, configured to be trained to subsequently identify undesirable sounds from audio data 128 and also fingerprint durations 140.

Similarly, the communications service 110 may utilize the video data 128 communicated between the user devices 304 and 308 as training data 214. For instance, the users 302 and 306 may give permission for the communications service 110 to utilize logs of video calls from previous communication sessions 102 facilitated by the communication service 110 as training communication data 214. The model-generation component 212 may label, tag, or otherwise indicate video data calls and/or portions of video data calls as representing desirable 310 or undesirable 312 sounds. For example, the model-generation component 212 may tag, label, or associate a desirable tag 310 with portions A 135 video data 134 that represents normal, or desired video data (e.g., all video data but undesirable video data), and may further tag, label, or associate an undesirable tag 312 with portions B 137 of video data 134 to indicate they represent undesirable sounds (e.g., crude hand gesture, sneezing, user picking their teeth, etc.). The model-generation component 210 may then input the tagged video data 134 into the machine-learning model(s) 136 to train the ML model(s) 136 to detect image fingerprints 138 that represent different unwanted or undesirable sounds. The ML model(s) 136 may comprise any type of machine-learning model, such as neural networks, configured to be trained to subsequently identify undesirable images from video data 134 and also fingerprint durations 140. For example, the ML model(s) 136 may determine that a partial crude gesture generally lasts 5 seconds.

In some examples, a third-party provider 314 may provide training communication data 214 and/or ML model(s) 136 for use by the communication service 110. For instance, the third-party provider 314 may also have obtained audio data 128 and/or video data 134 of communication sessions 102 between users. In some examples, the third-party provider 314 may be an appliance manufacture that has recordings of sounds made by their appliances that may be undesirable, such as the sound made by a dishwasher, a garbage disposal, a dryer, etc. In even further examples, the third-party provider 314 may provide portions of ML model(s) 136 that may be utilized, such as a third-party provider 314 that performs similar services for different languages, in different areas of the world, and so forth.

Figure 4A:
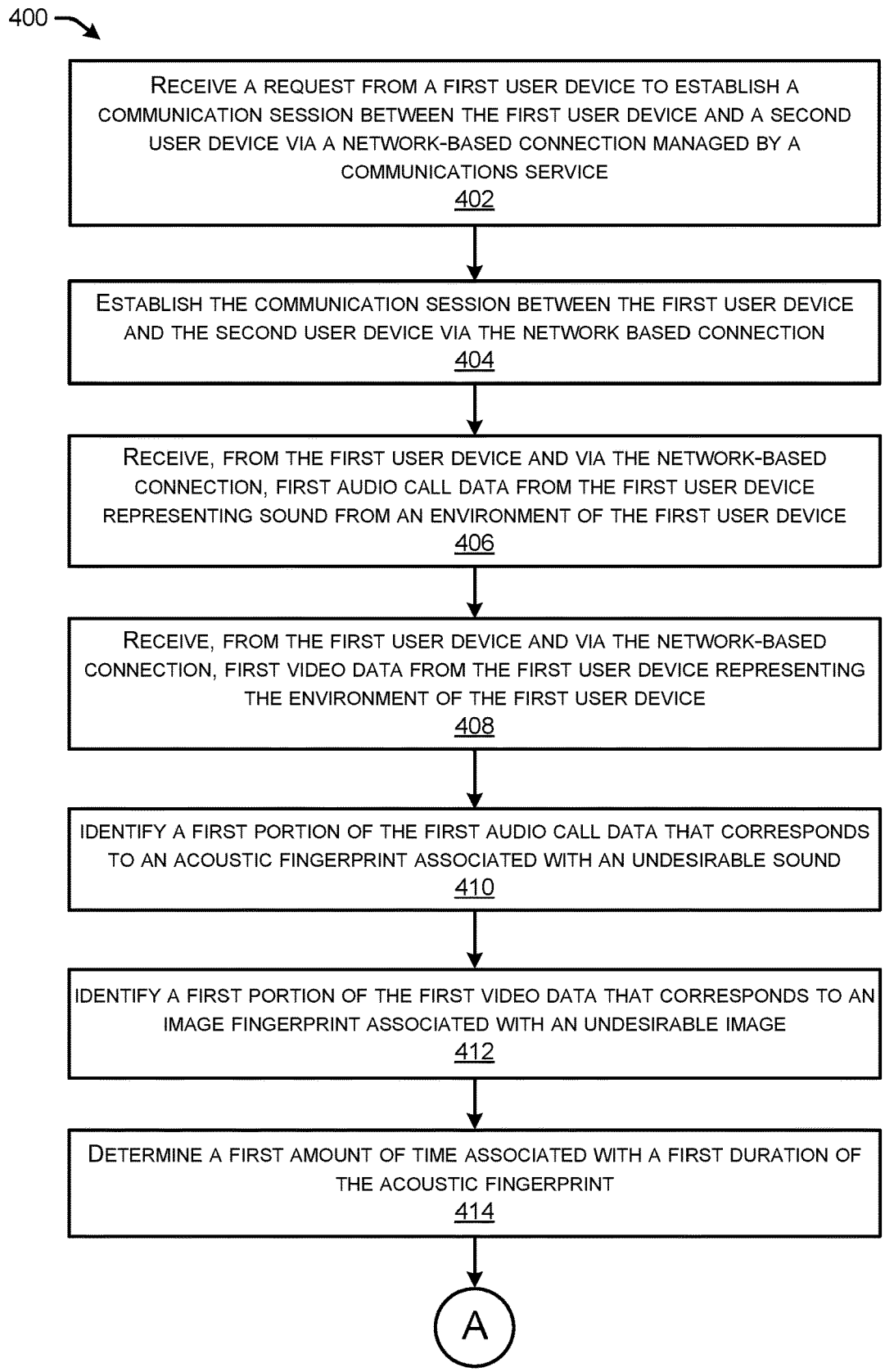
FIGS. 4A and 4B illustrate a flow diagram of an example method performed by a system for identifying, at least partly using a machine-learning model, and altering undesirable sounds in audio data and images in video data transmitted during communications sessions between two user devices.
Figure 4B:
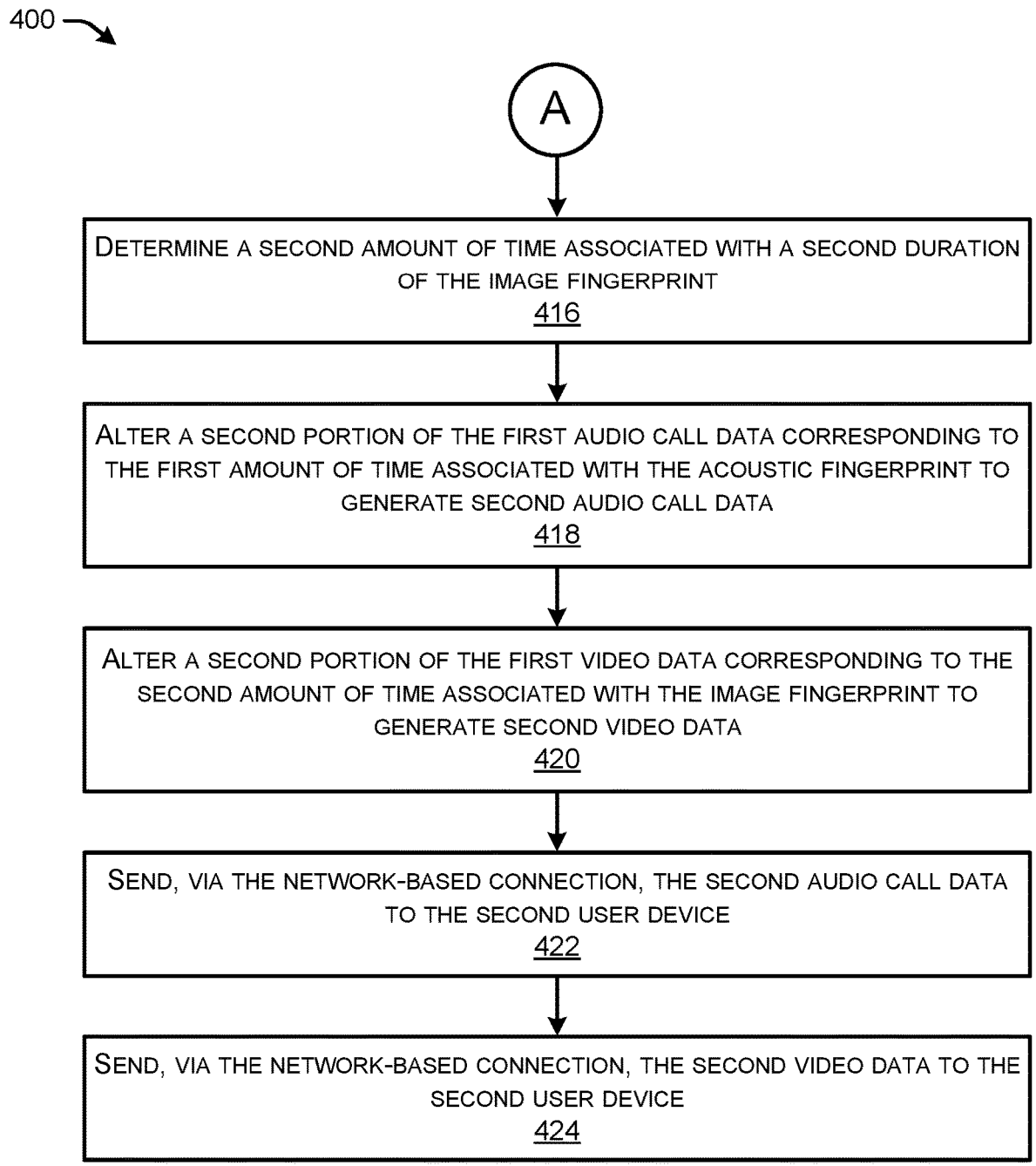

FIGS. 4A, 4B, and 5 illustrate flow diagrams of example methods 400 and 500 that illustrate aspects of the functions performed at least partly by the communications service 110 as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 4A and 4B illustrate a flow diagram of an example method performed by a system for identifying, at least partly using a machine-learning model, and altering undesirable sounds in audio data and images in video data transmitted during communications sessions between two user devices.

At 402, the communications service 110 may receive, at one or more computing devices of a cloud-based service provider, a request from a first user device to establish a communication session between the first user device and a second user device via a network-based connection managed by a communications service at least partly managed by the cloud-based service provider.

At 404, the communications service 110 may establish the communication session 102 between the first user device 108 and the second user device 116 via the network-based connection.

At 406, the communications service 110 may receive, from the first user device and via the network-based connection, first audio call data representing sound from an environment of the first user device.

At 408, the communications service 110 may receive, from the first user device and via the network-based connection, first video data representing the environment of the first user device.

At 410, the communications service 110 may identify a first portion of the first audio call data that corresponds to an acoustic fingerprint associated with an undesirable sound.

In some examples, identifying the first portion of the first audio call data that corresponds to the acoustic fingerprint associated with the undesirable sound is performed at least partly using a machine-learning (ML) model. In such examples, the process 400 may further comprise identifying the ML model based at least in part on a user account associated with the first user device, generating training audio data based at least in part on the first audio call data, wherein the generating includes: labeling at least one of the first portion of the first audio call data or the second portion of the first audio call data with a first indication that the at least one of the first portion of the first audio call data or the second portion of the first audio call data represents an undesirable sound, and labeling a third portion of the first audio call data with a second indication that the third portion of the first audio call data represents desirable sound, wherein the third portion of the first audio call data does not overlap with the first portion of the first audio call data or the second portion of the first audio call data, and training the ML model using the training audio data.

In some instances, the identifying the first portion of the first audio call data is performed in real-time or near-real-time for the communication session, and the second audio call data includes the first portion of the first audio call data.

At 412, the communications service 110 may identify a first portion of the first video data that corresponds to an image fingerprint associated with an undesirable image. At 414, the communications service may determine a first amount of time associated with a first duration of the acoustic fingerprint. At 416, the communications service 110 may determine a second amount of time associated with a second direction of the image fingerprint.

At 418, the communications service 110 may alter a second portion of the first audio call data corresponding to the first amount of time associated with the acoustic fingerprint to generate second audio call data, the second portion of the first audio call data being subsequent to the first portion of the first audio call data.

At 420, the communications service 110 may alter a second portion of the first video data corresponding to the second amount of time associated with the image fingerprint to generate second video data, the second portion of the first video data being subsequent to the first portion of the first video data.

At 422, the communications service 110 may send, via the network-based connection, the second audio call data to the second user device. At 424, the communications service 110 may send, via the network-based connection, the second video data to the second user device.

In some examples, the process 400 may further comprise identifying substitute audio data associated with the acoustic fingerprint, the substitute audio data representing at least one of a word or a sound to replace the first portion of the first audio call data, and inserting the substitute audio data into the second audio call data at a location from which the second portion of the first audio call data was altered such that the substitute audio data is configured to be output at the second user device in place of the second portion of the first audio call data.

FIG. 5 illustrates another flow diagram of an example method 500 for identifying and removing undesirable sounds from audio data communicated during communications sessions 102.

At 502, a communications service 110 may establish, at least partly by a communication service associated with a cloud-based service provider, a network-based communication session between a first computing device and a second computing device.

At 504, the communications service 110 may receive, first communication data from the first computing device, the first communication data comprising at least one of first audio data representing sound from an environment of the first computing device or first video data representing the environment.

At 506, the communications service 110 identify a portion of the first communication data that corresponds to a fingerprint associated with at least one of an undesirable sound or an undesirable image.

At 508, the communications service 110 may alter the portion of the first communication data to generate second communication data.

In some examples, altering the portion of the first communication data to generate the second communication data comprises at least one of refraining from sending the portion of the first video data to the second computing device, or removing the portion of the first video data to generate second video data does not include video data at a location corresponding to the portion of the first video data.

In various examples, altering the first communication data to generate the second communication data comprises altering the first video data to generate second video data, and the process 500 further comprises identifying substitute video data associated with the fingerprint associated with the undesirable image, the substitute video data representing at least one of a video or an image to replace the portion of the first video data, and inserting the substitute video data into the second video data at a location corresponding to the portion of the first audio data that was removed.

In some instances, altering the first communication data to generate the second communication data comprises altering the first audio data to generate second audio data, and altering the portion of the first audio data comprises attenuating a portion of the first audio data to generate the second audio data.

At 510, the communications service 110 may send the second communication data to the second computing device via the network-based communication session.

Figure 6:
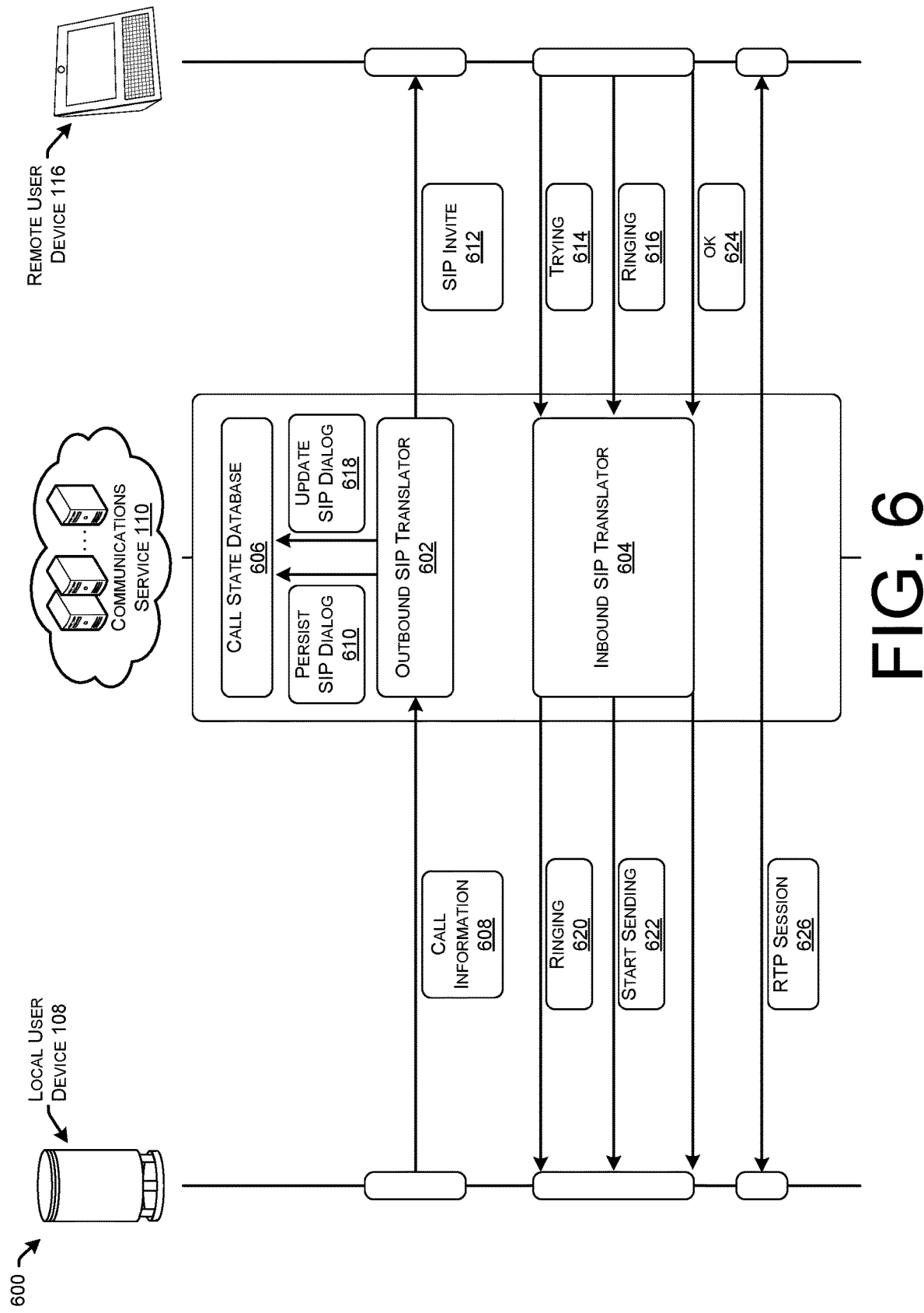
FIG. 6 illustrates example components for a communications service to establish a flow of data between devices.

FIG. 6 illustrates example components for a communications service to establish a flow of data between devices. FIG. 6 illustrates components that can be used to coordinate communications using a system or service, such as the communications service 110. The components shown in FIG. 6 carry out an example process 600 of signaling to initiate a communication session according to the present disclosure. In one example configuration, the communications service 110 is configured to enable communication sessions (e.g., using session initiation protocol (SIP)). For example, the communications service 110 may send SIP messages to endpoints (e.g., recipient devices such as local user device 108 and remote user device 116) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the communications service 110 may send SIP messages to initiate a single RTP media stream between two endpoints (e.g., direct RTP media stream between the local user device 108 and a remote user device 116) and/or to initiate and facilitate RTP media streams between the two endpoints (e.g., RTP media streams between the local user device 108 and the communications service 110 and between the communications service 110 and the remote user device 116). During a communication session, the communications service 110 may initiate two media streams, with a first media stream corresponding to incoming audio data from the local user device 108 to the remote user device 116 and a second media stream corresponding to outgoing audio data from the remote user device 116 to the local user device 108, although for ease of explanation this may be illustrated as a single RTP media stream.

As illustrated in FIG. 6, the communications service 110 may include components to coordinate communications between devices, such as an outbound SIP translator 602, an inbound SIP translator 604, and a call state database 606. As shown, the local user device 108 may send (608) call information to the outbound SIP translator 602, which may identify from which phone number the local user device 108 would like to initiate the call, to which phone number the local user device 108 would like to initiate the call, from which local user device 108 a user would like to perform the call, etc.

The outbound SIP translator 602 may include logic to handle sending outgoing SIP requests and sending responses to incoming SIP requests. After receiving the call information, the outbound SIP translator 602 may persist (610) a SIP dialog using the call state database 606. For example, the DSN may include information such as the name, location, and driver associated with the call state database 606 (and, in some examples, a user ID and password of the user) and the outbound SIP translator 602 may send a SIP dialog to the call state database 606 regarding the communication session. The call state database 606 may persist the call state if provided a device ID and one of a call ID or a dialog ID. The outbound SIP translator 602 may send (612) a SIP Invite to a SIP Endpoint (e.g., remote user device 116, a recipient device, a Session Border Controller (SBC), or the like).

The inbound SIP translator 604 may include logic to convert SIP requests/responses into commands to send to the devices 108 and/or 116 and may handle receiving incoming SIP requests and incoming SIP responses. The remote user device 116 may send (614) a TRYING message to the inbound SIP translator 604 and may send (616) a RINGING message to the inbound SIP translator 604. The inbound SIP translator 604 may update (618) the SIP dialog using the call state database 606 and may send (620) a RINGING message to the local user device 108.

When the communication session is accepted by the remote user device 116, the remote user device 116 may send (624) an OK message to the inbound SIP translator 604, the inbound SIP translator 604 may send (622) a startSending message to the local user device 108. The startSending message may include information associated with an internet protocol (IP) address, a port, encoding, or the like required to initiate the communication session. Using the startSending message, the local user device 108 may establish (626) an RTP communication session with the remote user device 116 via the communications service 110. In some examples, the communications service 110 may communicate with the local user device 108 as an intermediary server.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

While FIG. 6 illustrates the RTP communication session 626 as being established between the local user device 108 and the remote user device 116, the disclosure is not limited thereto and the RTP communication session 626 may be established between the local user devices 108 and a telephone network associated with the remote user device 116 without departing from the disclosure.

FIGS. 7A and 7B illustrate example components for a communications service 110 to establish a flow of data between devices. For instance, FIGS. 7A and 7B illustrate examples 700 and 708 of establishing media streams between devices according to the present disclosure. In some examples, the local user device 108 may have a publicly accessible IP address and may be configured to establish the RTP communication session directly with the remote user device 116. To enable the local user device 108 to establish the RTP communication session, the communications service 110 may include Session Traversal of User Datagram Protocol (UDP) Through Network Address Translators (NATs) server(s) (e.g., STUN server(s) 702). The STUN server(s) 702 may be configured to allow NAT clients (e.g., a local user device 108 behind a firewall) to setup calls to a VoIP provider hosted outside of the local network by providing a public IP address, the type of NAT they are behind, and a port identifier associated by the NAT with a particular local port. As illustrated in FIG. 7A, the local user device 108 may perform (704) IP discovery using the STUN server(s) 702 and may use this information to set up an RTP communication session 706 (e.g., UDP communication) between the local user device 108 and the remote user device 116 to establish a call.

In some examples, the local user device 108 may not have a publicly accessible IP address. For example, in some types of NAT the local user device 108 cannot route outside of the local network. To enable the local user device 108 to establish an RTP communication session, the communications service 110 may include Traversal Using relays around NAT (TURN) server(s) 710. The TURN server(s) 710 may be configured to connect the local user device 108 to the remote user device 116 when the local user device 108 is behind a NAT. As illustrated in FIG. 7B, the local user device 108 may establish (712) an RTP session with the TURN server(s) 710 and the TURN server(s) 710 may establish (714) an RTP session with the remote user device 116. Thus, the local user device 108 may communicate with the remote user device 116 via the TURN server(s) 710. For example, the local user device 108 may send outgoing audio data to the communications service 110 and the communications service 110 may send the outgoing audio data to the remote user device 116. Similarly, the remote user device 116 may send incoming audio/video data to the communications service 110 and the communications service 110 may send the incoming data to the local user device 108.

In some examples, the communications service 110 may establish communication sessions using a combination of the STUN server(s) 702 and the TURN server(s) 710. For example, a communication session may be more easily established/configured using the TURN server(s) 710, but may benefit from latency improvements using the STUN server(s) 702. Thus, the system may use the STUN server(s) 702 when the communication session may be routed directly between two devices and may use the TURN server(s) 710 for all other communication sessions. Additionally, or alternatively, the system may use the STUN server(s) 702 and/or the TURN server(s) 710 selectively based on the communication session being established. For example, the system may use the STUN server(s) 702 when establishing a communication session between two devices (e.g., point-to-point) within a single network (e.g., corporate LAN and/or WLAN), but may use the TURN server(s) 710 when establishing a communication session between two devices on separate networks and/or three or more devices regardless of network(s). When the communication session goes from only two devices to three or more devices, the system may need to transition from the STUN server(s) 702 to the TURN server(s) 710. Thus, if the system anticipates three or more devices being included in the communication session, the communication session may be performed using the TURN server(s) 710.

Figure 8:
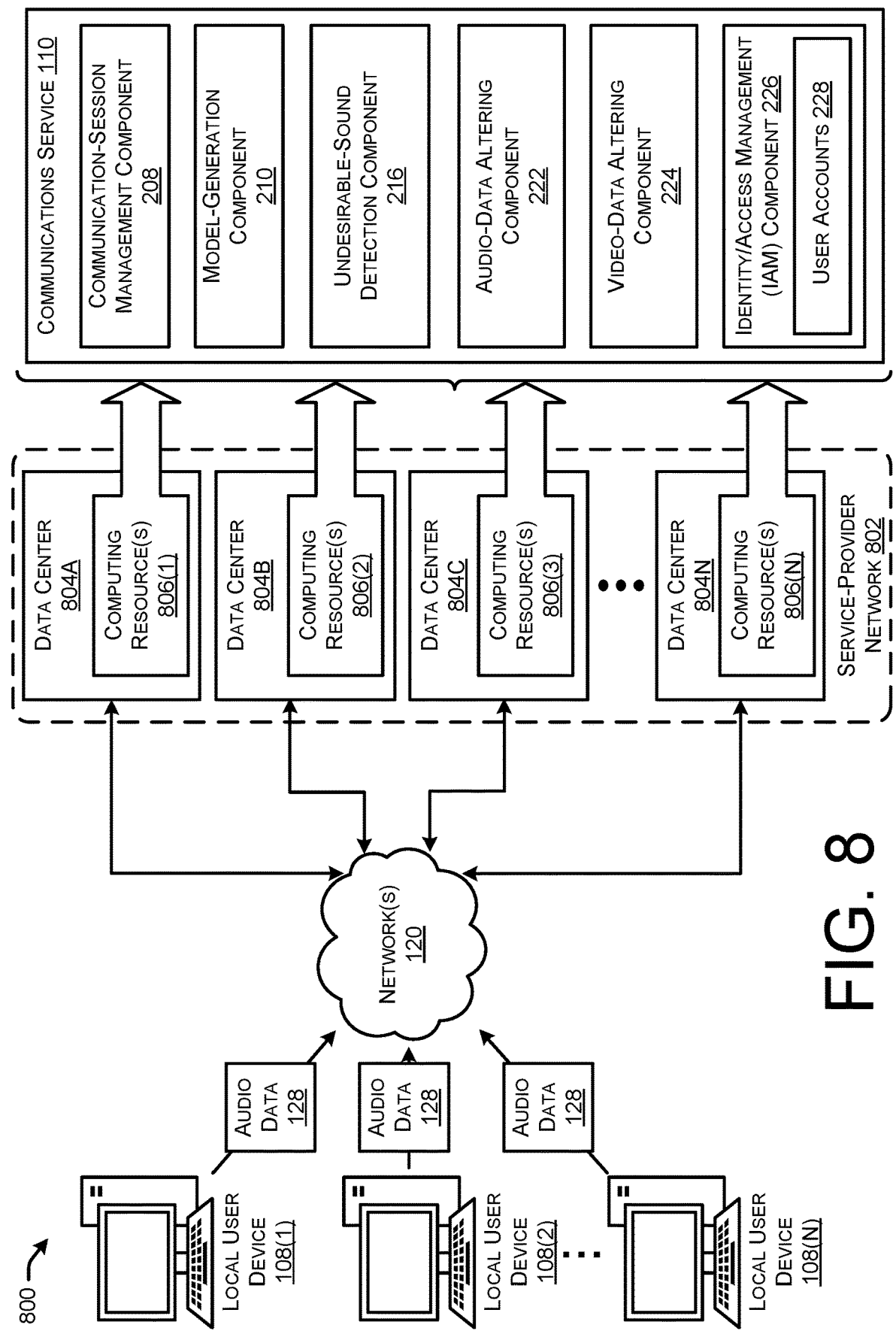
FIG. 8 is a system and network diagram that shows an illustrative operating environment that includes a service provider network that can be configured to implement aspects of the functionality described herein.

FIG. 8 is a system and network diagram that shows an illustrative operating environment 800 that includes a service-provider network 802 (that may be part of or associated with a cloud-based service platform, such as a provider of the communications service 110) that can be configured to implement aspects of the functionality described herein.

The service-provider network 802 can provide computing resources 806, like VM instances and storage, on a permanent or an as-needed basis. Among other types of functionality, the computing resources 806 provided by the service-provider network 802 may be utilized to implement the various services described above. The computing resources provided by the service-provider network 802 can include various types of computing resources, such as data processing resources like VM instances, data storage resources, networking resources, data communication resources, application-container/hosting services, network services, and the like.

Each type of computing resource provided by the service-provider network 802 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 802 can also be configured to provide other types of computing resources not mentioned specifically herein.

The computing resources 806 provided by the service-provider network 802 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations. One illustrative embodiment for a data center 604 that can be utilized to implement the technologies disclosed herein will be described below with regard to FIG. 8.

The data centers 804 may be configured in different arrangements depending on the service-provider network 802. For example, one or more data centers 804 may be included in or otherwise make-up an availability zone. Further, one or more availability zones may make-up or be included in a region. Thus, the service-provider network 802 may comprise one or more availability zones, one or more regions, and so forth. The regions may be based on geographic areas, such as being located within a predetermined geographic perimeter.

The users 106/114 and/or admins of the service-provider network 802 may access the computing resources 806 provided by the data centers 804 of the service-provider network 802 over any wired and/or wireless network(s) 120 (utilizing a local user device 108, remote user device 116, and/or another accessing-user device), which can be a wide area communication network ("WAN"), such as the Internet, an intranet or an Internet service provider ("ISP") network or a combination of such networks. For example, and without limitation, a device operated by aa user of the service-provider network 802 may be utilized to access the service-provider network 802 by way of the network(s) 120. It should be appreciated that a local-area network ("LAN"), the Internet, or any other networking topology known in the art that connects the data centers 804 to remote clients and other users can be utilized. It should also be appreciated that combinations of such networks can also be utilized.

As illustrated in FIG. 8, the service-provider network 802 may be configured to support some or all of the components of the communications service 110. For example, the computing resources 806 in one or all of the data centers 804 may provide the resources to store and/or execute the components of the communications service 110. Further the data center(s) 804 may also perform functions for establishing the communication sessions 102. Thus, the local user device(s) 108 may send audio data 128 over the networks 120 and through the service-provider network 802 as part of the communication sessions 102.

Figure 9:
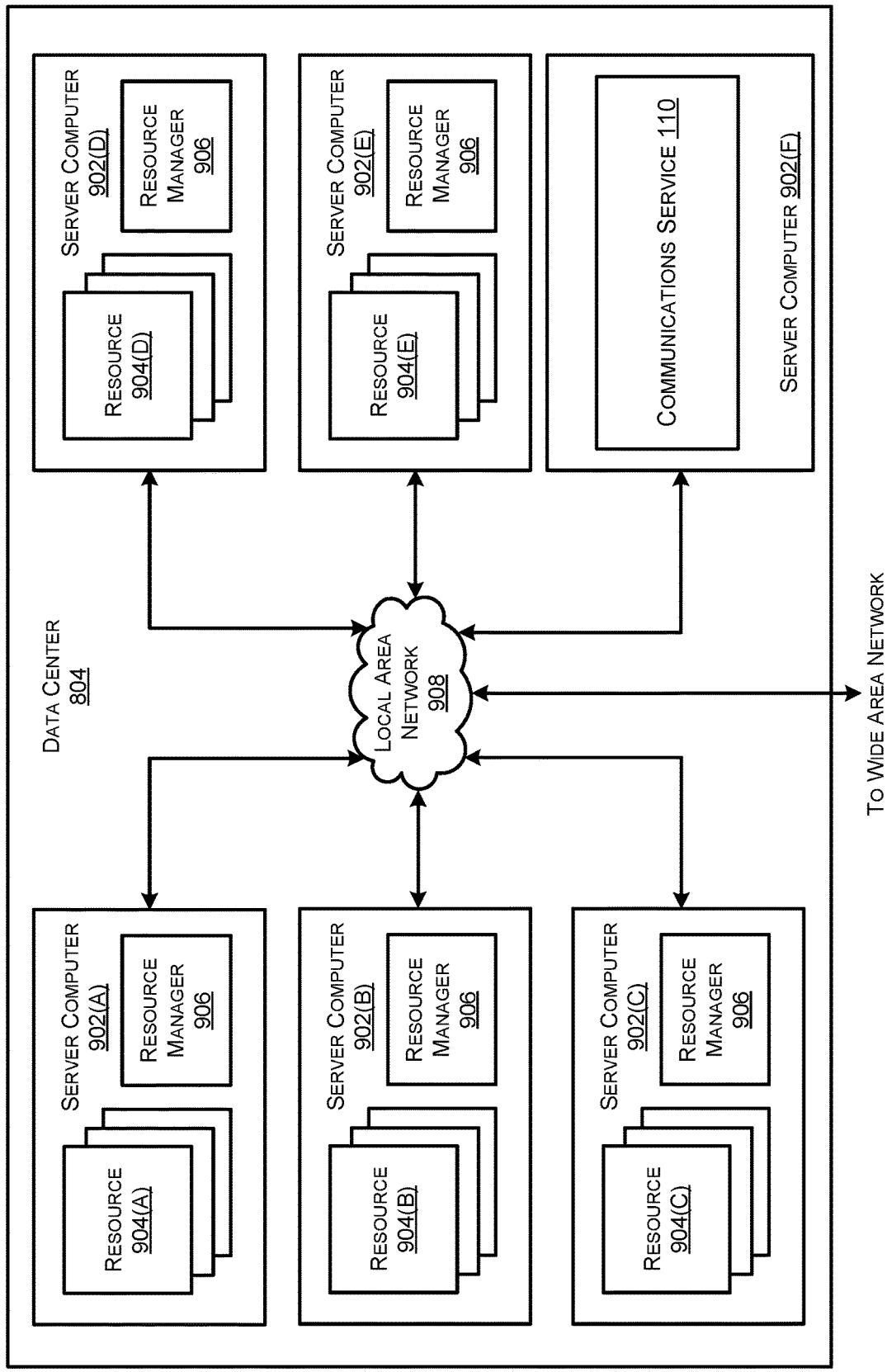
FIG. 9 is a computing system diagram illustrating a configuration for a data center that can be utilized to implement aspects of the technologies disclosed herein.

FIG. 9 is a computing system diagram illustrating a configuration for a data center 804 that can be utilized to implement aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, or correspond to, the computing resources 806 described herein. In some instances, one or more of the server computers 902 may be configured to support at least a portion of the communications service 110 described herein.

The server computers 902 can be standard tower, rackmount, or blade server computers configured appropriately for providing the computing resources described herein (illustrated in FIG. 9 as the computing resources 904A-904E). As mentioned above, the computing resources provided by the service-provider network 802 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 804 can also be configured to provide network services and other types of services.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 902A-902F in each data center 804, and, potentially, between computing resources in each of the server computers 902. It should be appreciated that the configuration of the data center 804 described with reference to FIG. 9 is merely illustrative and that other implementations can be utilized.

Figure 10:
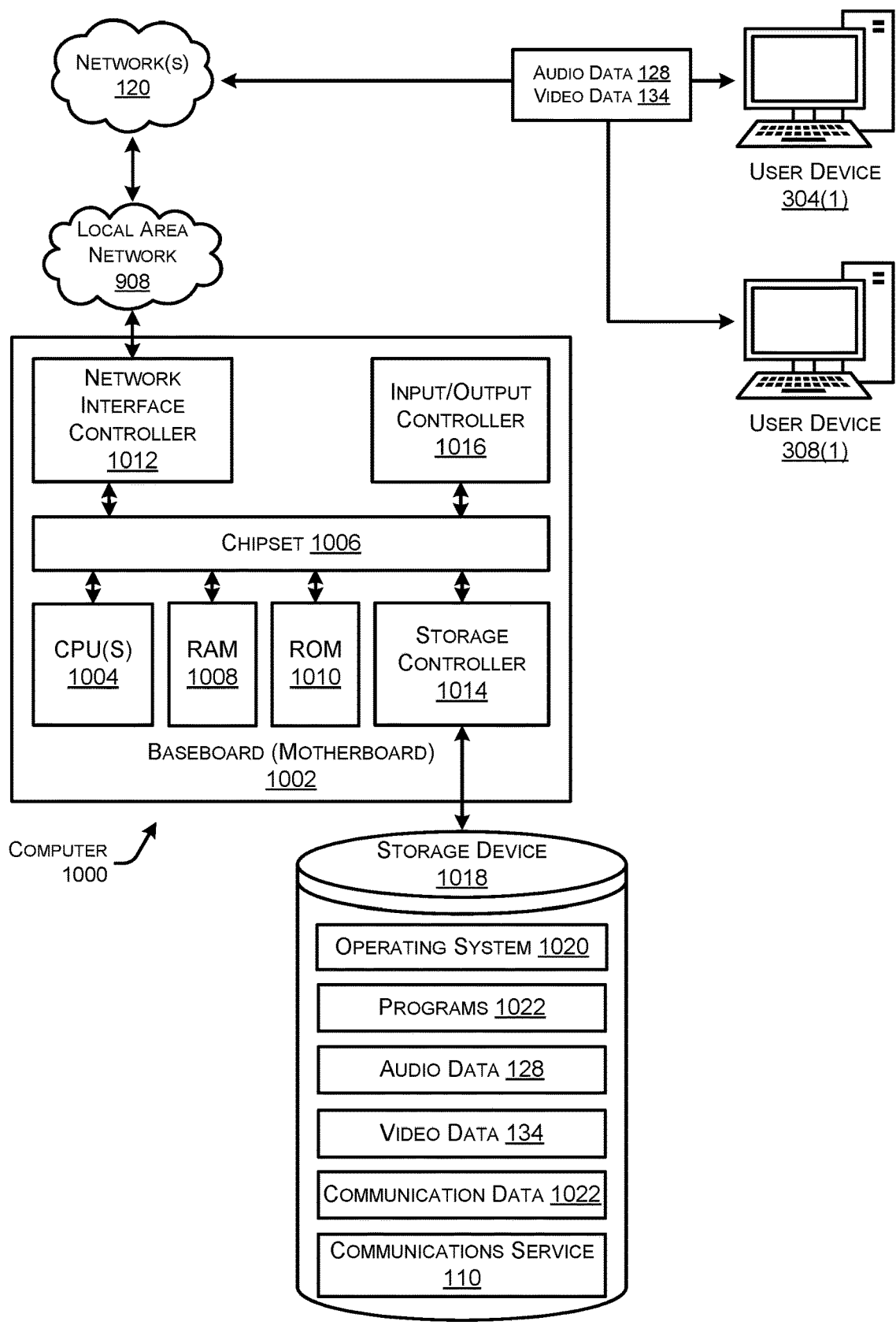
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. In the illustrated example, the computer 1000 may store the audio data 128 and video data 134, and further include at least portions of the functionality of the communications service 110. For instance, the computer 1000 may be utilized as intermediary server(s) to send and receive the audio data 128 and video data 134, and also perform the data altering/removing/filtering techniques described herein by the communications service 110.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a NIC 101012, such as a gigabit Ethernet adapter. The NIC 1012 is capable of connecting the computer 1000 to other computing devices over the network 908 (or 120). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022, and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the cloud-based service platform 102, and or any components included therein, may be supported by one or more devices similar to computer 1000. Stated otherwise, some or all of the operations performed by the service-provider network 602, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   establishing, at least partly by a communication service, a communication session between a first computing device and a second computing device;
   receiving, at the communication service, first communication data from the first computing device, the first communication data comprising first audio data representing sound from an environment of the first computing device;
   identifying, at the communications service and at least partly using a machine-learning (ML) model, a portion of the first audio data that includes a first sub-portion representing an undesirable sound and a second sub-portion representing a desirable sound;
   altering, at the communication service, the portion of the first audio data to result in second audio data, wherein altering the portion of the first audio data includes attenuating the first sub-portion of the first audio data that represents the undesirable sound; and
   sending, from the communication service, the second audio data to the second computing device via the communication session.

2. The method of claim 1, wherein altering the portion of the first audio data comprises at least one of:
   attenuating the portion of the first audio data; or
   removing the portion of the first audio data.

3. The method of claim 1, wherein:
   the first sub-portion represents at least one of a dog barking, a doorbell ringing, or an appliance; and
   the second sub-portion represents speech of a user.

4. The method of claim 1, further comprising:
   generating training data using a plurality of audio data, wherein the generating includes:

labeling first portions of the plurality of audio data with first indications that the first portions each represent one or more undesirable sounds; and labeling second portions of the plurality of audio data with second indications that the second portions each represent one or more desirable sounds; and training the ML model using the training data.

5. The method of claim 1, wherein the ML model comprises a first ML model, further comprising:

training the first ML model with first training data in a first natural language such that the first ML model analyzes audio data representing speech in the first natural language; and training a second ML model with second training data in a second natural language such that the second ML model analyzes audio data representing speech in the second natural language.

6. The method of claim 1, wherein the identifying the portion of the first audio data is performed in real-time or near-real-time for the communication session.

7. The method of claim 1, further comprising:

receiving, from the first computing device and via the communication session, video data that represents the environment of the first computing device during a period of time that corresponds to at least the first audio data; and analyzing the video data to identify a trigger event associated with an action that causes the undesirable sound, wherein identifying the portion of the first audio data that corresponds to the undesirable sound is based at least in part on identifying the trigger event.

8. A system comprising:

one or more processors; and one or more non-transitory computer-readable media storing computer-executable instructions that, when executed by the one or more processors, cause the one or more processors to perform operations comprising:

establishing, at least partly by a conferencing service, a communication session between a first computing device and a second computing device;

receiving, at the conferencing service, first communication data from the first computing device, the first communication data comprising first audio data representing sound from an environment of the first computing device;

identifying, at the conferencing service and at least partly using a machine-learning (ML) model, a portion of the first audio data that includes a first sub-portion representing an undesirable sound and a second sub-portion representing a desirable sound;

attenuating, at the conferencing service, the first sub-portion representing the undesirable sound in the portion of the first audio data to result in second audio data; and sending, from the conferencing service, the second audio data to the second computing device via the communication session.

9. The system of claim 8, wherein altering the portion of the first audio data comprises at least one of:

attenuating the portion of the first audio data; or removing the portion of the first audio data.

10. The system of claim 8, the operations further comprising:

generating training data using a plurality of audio data, wherein the generating includes:

labeling first portions of the plurality of audio data with first indications that the first portions each represent one or more undesirable sounds; and labeling second portions of the plurality of audio data with second indications that the second portions each represent one or more desirable sounds; and training the ML model using the training data.

11. The system of claim 8, wherein the ML model comprises a first ML model, the operations further comprising:

training the first ML model with first training data in a first natural language such that the first ML model analyzes audio data representing speech in the first natural language; and training a second ML model with second training data in a second natural language such that the second ML model analyzes audio data representing speech in the second natural language.

12. The system of claim 8, wherein the identifying the portion of the first audio data is performed in real-time or near-real-time for the communication session.

13. The system of claim 8, the operations further comprising:

receiving, from the first computing device and via the communication session, video data that represents the environment of the first computing device during a period of time that corresponds to at least the first audio data; and analyzing the video data to identify a trigger event associated with an action that causes the undesirable sound, wherein identifying the portion of the first audio data that corresponds to the undesirable sound is based at least in part on identifying the trigger event.

14. A method comprising:

establishing, at least partly by a conferencing service, a communication session between a first computing device and a second computing device;

receiving, at the conferencing service, first communication data from the first computing device, the first communication data comprising at least one of first audio data representing sound from an environment of the first computing device or first video data representing the environment;

identifying, at the conferencing service and at least partly using a machine-learning (ML) model, a portion of the first communication data that includes a first sub-portion representing an undesirable sound and a second sub-portion representing a desirable sound;

attenuating, at the conferencing service, the first sub-portion representing the undesirable sound in the portion of the first audio data to result in second audio data; and sending, from the conferencing service, the second audio data to the second computing device via the communication session.

15. The method of claim 14, wherein altering the portion of the first communication data comprises at least one of:

attenuating the portion of the first audio data; or removing the portion of the first audio data.

16. The method of claim 14, further comprising:

generating training data using a plurality of audio data, wherein the generating includes:

labeling first portions of the plurality of audio data with first indications that the first portions each represent one or more undesirable sounds; and labeling second portions of the plurality of audio data with second indications that the second portions each represent one or more desirable sounds; and training the ML model using the training data.

17. The method of claim 14, wherein the identifying the portion of the first audio data is performed in real-time or near-real-time for the communication session.

\* \* \* \* \*